(12) United States Patent
Minezawa

(10) Patent No.: US 10,450,922 B2
(45) Date of Patent: Oct. 22, 2019

(54) UREA WATER INJECTION SYSTEM AND METHOD FOR PREVENTING CRYSTALLIZATION IN UREA WATER INJECTION DEVICE

(71) Applicant: ISUZU MOTORS LIMITED, Tokyo (JP)

(72) Inventor: Masanobu Minezawa, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 105 days.

(21) Appl. No.: 15/525,763

(22) PCT Filed: Nov. 9, 2015

(86) PCT No.: PCT/JP2015/081458
§ 371 (c)(1),
(2) Date: May 10, 2017

(87) PCT Pub. No.: WO2016/076256
PCT Pub. Date: May 19, 2016

(65) Prior Publication Data
US 2017/0314440 A1    Nov. 2, 2017

(30) Foreign Application Priority Data

Nov. 13, 2014    (JP) .................. 2014-230611

(51) Int. Cl.
*F01N 3/20*    (2006.01)
*B01D 53/90*    (2006.01)
(Continued)

(52) U.S. Cl.
CPC ............. *F01N 3/208* (2013.01); *B01D 53/90* (2013.01); *B01D 53/9418* (2013.01);
(Continued)

(58) Field of Classification Search
CPC ............ B01D 2251/2067; B01D 53/90; F01N 2610/02; F01N 2610/105; F01N 2610/146; F01N 3/08; F01N 3/18; F01N 3/208
See application file for complete search history.

(56) References Cited

U.S. PATENT DOCUMENTS

2007/0092413 A1    4/2007    Hirata et al.
2007/0163232 A1    7/2007    Ueno
(Continued)

FOREIGN PATENT DOCUMENTS

CN    1965153 A    5/2007
CN    201983933 U    9/2011
(Continued)

OTHER PUBLICATIONS

Extended European Search Report for related EP Application No. 15859438.2, dated Jun. 4, 2018; 9 pages.
(Continued)

*Primary Examiner* — Audrey K Bradley
*Assistant Examiner* — Anthony Ayala Delgado
(74) *Attorney, Agent, or Firm* — Procopio, Cory, Hargreaves & Savitch LLP

(57) ABSTRACT

A urea water solution injection system includes a urea water solution injection device for spraying a urea water solution into a portion of an exhaust passageway upstream of a selective catalytic reduction catalyst device, to reduce NOx in exhaust gas discharged from an internal combustion engine. Engine coolant is circulated through the urea water solution injection device to prevent freezing of the urea water solution. A crystal dissolution control unit performs crystal dissolution control on the urea water solution injection device by energizing at a preset amount of energization at a state where a urea water solution supply pump for
(Continued)

supplying a urea water solution to the urea water solution injection device is kept stopped, and the crystal dissolution control unit performs the crystal dissolution control for a crystal dissolving energization time calculated in advance, after the engine is started but before a urea water solution is supplied.

6 Claims, 2 Drawing Sheets

(51) Int. Cl.
    *F01N 3/08* (2006.01)
    *F01N 3/18* (2006.01)
    *B01D 53/94* (2006.01)

(52) U.S. Cl.
    CPC ..... *B01D 53/9431* (2013.01); *B01D 53/9495* (2013.01); *F01N 3/08* (2013.01); *F01N 3/18* (2013.01); *B01D 2251/2067* (2013.01); *F01N 2610/02* (2013.01); *F01N 2610/105* (2013.01); *F01N 2610/146* (2013.01)

(56) References Cited

U.S. PATENT DOCUMENTS

| | | |
|---|---|---|
| 2007/0251226 A1 | 11/2007 | Kaneko |
| 2010/0242439 A1 | 9/2010 | Domon et al. |
| 2013/0055701 A1 | 3/2013 | Yan et al. |
| 2013/0061949 A1 | 3/2013 | Minezawa et al. |
| 2013/0067892 A1 | 3/2013 | Minezawa et al. |
| 2013/0071291 A1 | 3/2013 | Onodera et al. |
| 2013/0269321 A1* | 10/2013 | Watanabe ............... F01N 3/208 60/274 |
| 2014/0290214 A1* | 10/2014 | Heichelbech ........... F16L 53/30 60/274 |
| 2017/0321582 A1* | 11/2017 | Nakao .................... B01D 53/90 |

FOREIGN PATENT DOCUMENTS

| | | |
|---|---|---|
| CN | 102748101 A | 10/2012 |
| CN | 102892985 A | 1/2013 |
| CN | 102906385 A | 1/2013 |
| EP | 2573346 A1 | 3/2013 |
| JP | 2005-113687 A | 4/2005 |
| JP | 2005-127318 A | 5/2005 |
| JP | 2011-074889 A | 4/2011 |
| JP | 2011-247135 A | 12/2011 |
| JP | 2012-091728 A | 5/2012 |
| JP | 2013-221425 A | 10/2013 |
| JP | 2014-145276 A | 8/2014 |
| JP | 2014-177883 A | 9/2014 |
| WO | 2009050948 A1 | 4/2009 |
| WO | 2012090801 A1 | 7/2012 |

OTHER PUBLICATIONS

International Search Report and Written Opinion for PCT App No. PCT/JP2015/081458 dated Feb. 16, 2016, 9 pgs.

First Office Action for related CN App No. 201580061521.0 dated Oct. 23, 2018, 17 pages.

* cited by examiner

[FIG. 1]
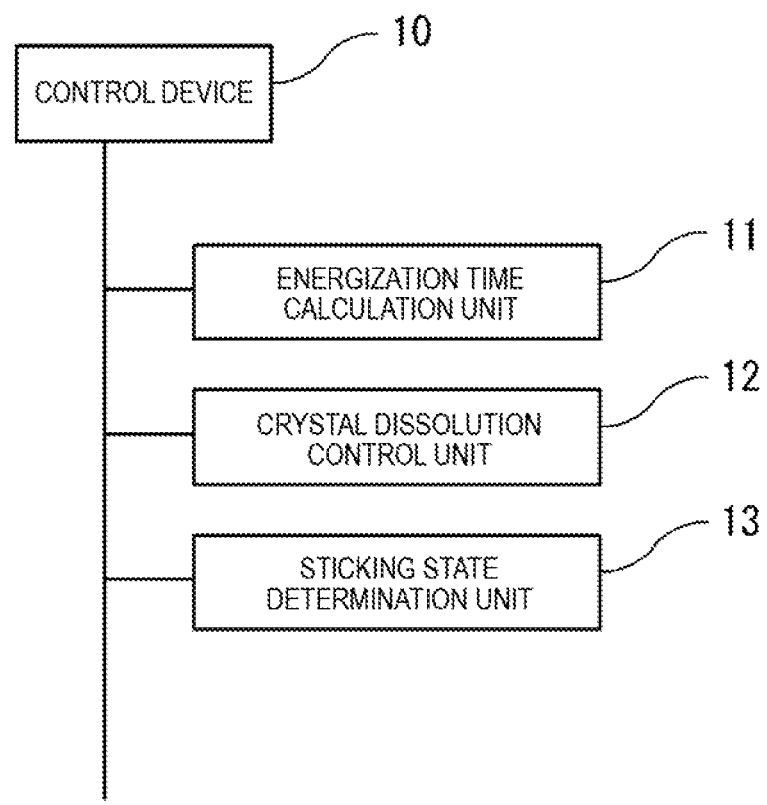

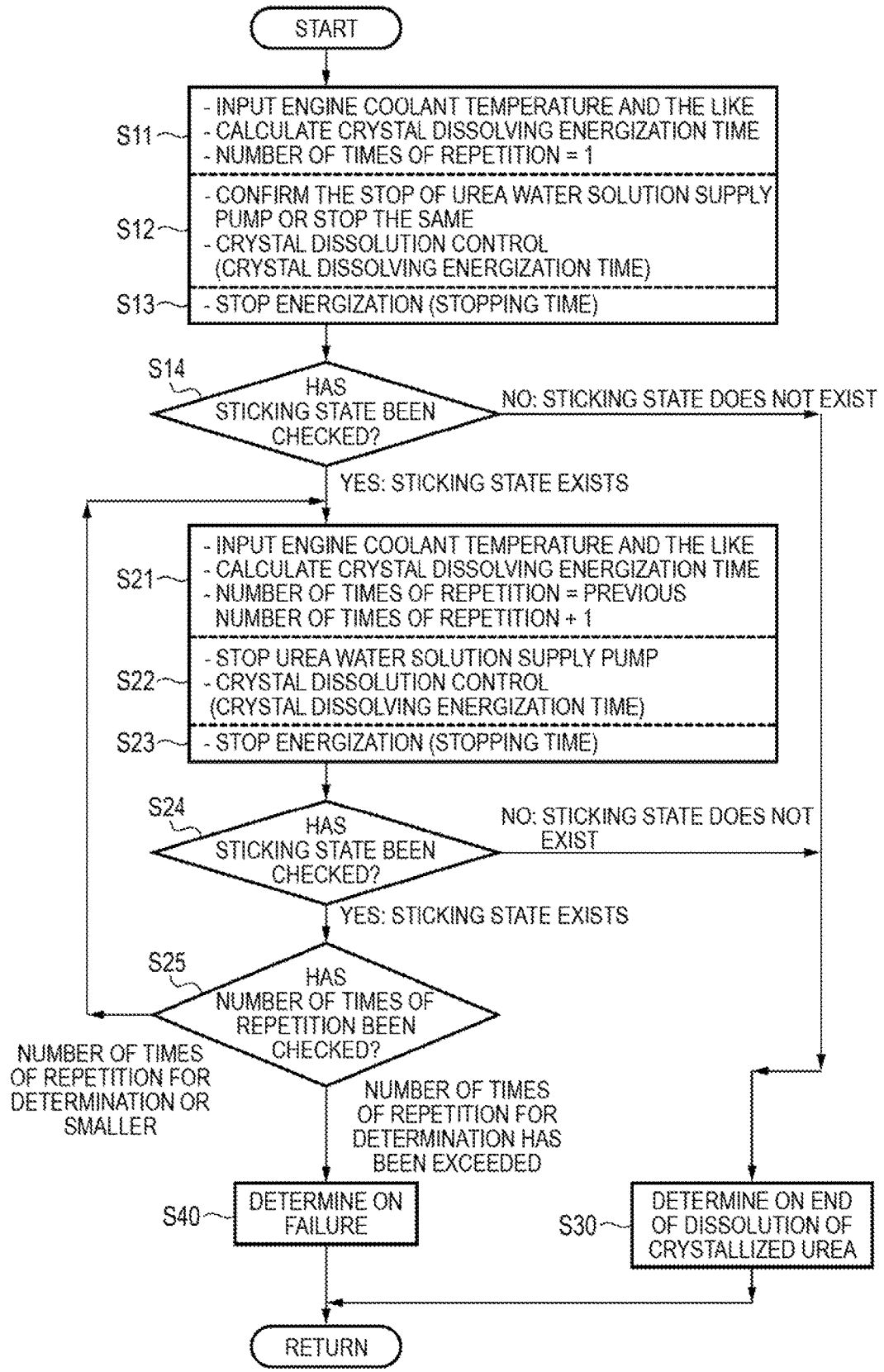

UREA WATER INJECTION SYSTEM AND METHOD FOR PREVENTING CRYSTALLIZATION IN UREA WATER INJECTION DEVICE

CROSS-REFERENCE TO RELATED APPLICATIONS

This application is a U.S. National Stage entry of PCT Application No. PCT/JP2015/081458, filed on Nov. 9, 2015, which claims priority to Japanese Patent Application No. 2014-230611, filed Nov. 13, 2014, the contents of which are incorporated herein by reference.

TECHNICAL FIELD

The present invention relates to, in a area water solution injection system for an internal combustion engine, a urea water solution injection system which can prevent crystallization of urea water solution and a sticking of urea inside the urea water injection device and a method for preventing crystallization in the urea water injection device.

BACKGROUND ART

In general, in vehicles equipped with an internal combustion engine such as a diesel engine, an exhaust emission control system including a urea water solution injection system and a selective catalytic reduction catalyst (SCR catalyst) device in combination is provided to remove NOx (nitrogen oxides) contained in exhaust gas discharged from the internal combustion engine. In this exhaust emission control system, a urea water solution is sprayed into the exhaust gas which passes through an interior of an exhaust passageway from a urea water solution injection device (a dosing valve: DV) which is provided on a portion of the exhaust passageway which is disposed on an upstream side of the selective catalytic reduction catalyst device to thereby produce ammonia ($NH_3$) from the urea water solution, and NOx contained ill exhaust gas is reduced by the use of the ammonia so produced in the selective catalytic reduction catalyst device to thereby reduce NOx from the exhaust gas.

In the urea water solution injection device used together with the selective catalytic reduction catalyst device, when an engine starter key is off to stop the engine, an emptying operation is performed in which a urea water solution remaining in a urea water solution piping is returned to a urea water solution tank. Since the urea water solution injection device is fully opened in performing the emptying operation, high temperature exhaust gas within the exhaust pipe pass through the urea water solution injection device, whereby the interior of the urea water solution injection device is heated to high temperatures once. Thereafter, however, since the engine is stopped, the temperature inside the urea water solution injection device decreases moderately, and a slight amount of urea water solution which remains inside the urea water solution injection device is frozen to be crystallized as the temperature inside the urea water solution injection device so decreases. Since a needle of the urea water solution injection device is stuck therein and cannot move any more when the urea water solution is frozen to be crystallized, urea water solution cannot be sprayed when the engine is restarted.

In relation to the closure of the urea water solution supply line, JP-A-2014-145276 proposes a urea water solution piping closure detection apparatus for SCR using urea for detecting accurately whether or not a piping from a urea water solution supply pump to a dosing valve (a urea water solution injection device) for spraying a urea water solution is closed. This urea water solution piping closure detection apparatus for urea SCR includes a closure determination unit for detecting the clogging of the piping from a detection value of a pressure sensor for detecting a pressure in a urea water solution return line through which a urea water solution is returned under pressure when an emptying control in which a urea water solution remaining in the piping is returned to a urea water solution tank is performed by performing a start-up control in which a supply pump is driven to raise the pressure in the piping when an engine starter key is switched on and thereafter performing the emptying control when a detection value of an exhaust gas temperature sensor which is provided on a portion of an exhaust passageway which is disposed upstream of an SCR catalyst device is equal to or lower than a preset temperature and a detection value of a urea water solution sensor far detecting the temperature of a urea water solution in the urea water solution tank is equal to or higher than a fleeting temperature.

With this urea water solution piping closure apparatus, although it is described that a that device is driven to cause an engine coolant to flow to the urea water solution tank and the dosing valve to thaw the urea water solution frozen in the tank and the valve when the temperature of the urea water solution which is detected by the urea water solution sensor is equal to or lower than the freezing temperature (although depending upon the concentration of the urea water solution, $-11°$ C. with a normal concentration of 32.5%), there still remains a problem that the engine coolant at its normal temperature can thaw only the frozen urea water solution but cannot dissolve the urea which is crystallized in the dosing valve.

In addition, JP-A-2013-221425 proposes an injector control device for an exhaust emission control system for promoting the thawing of a frozen urea water solution by heating the whole of an injector (a urea water solution injector) which sprays a urea water solution when it is supplied with an electric current of equal to or greater than an upper limit electric current value by heating an electromagnetic drive unit of the injector by supplying the electromagnetic drive unit with an electric current of smaller than the upper limit electric current value which prevents the spray of a urea water solution by the injector when the temperature of a urea water solution which is supplied to the injector is lower than a preset lower limit temperature in order to avoid an addition of a urea water solution at other timings than a predetermined timing, while promoting the thawing of the frozen urea water solution.

Also in this injector control device the injector control device intends to promote the thawing of the frozen urea water solution, and there still remains a problem that by the electric current that is smaller than the upper limit current value which cannot open, the injector control device can only than the frozen urea water solution but cannot dissolve the urea which is formed in the interior of the injector as a result of the urea water, solution being frozen to be crystallized.

Further, for example, JP-A-2011-247135 proposes an SCR system including a sticking prevention system for preventing the sticking of urea water solution formed as a result of the urea water solution being frozen to be crystallized. In order to prevent such sticking of crystallized urea, the sticking prevention system performs a sticking preventing control in which in such a state that the temperature of exhaust gas in an exhaust passageway is lower than an SCR catalyst activation temperature, when the exhaust gas temperature is equal to or higher than a urea water solution crystallization temperature, the sticking prevention system opens a dosing valve to prevent the sticking of urea formed inside the dosing valve as a result of the crystallization of the urea water solution and performs an emptying operation of returning the urea water solution in the dosing valve to a urea water solution tank by controlling a supply unit so as to suck the exhaust gas in the exhaust passageway into an interior of the dosing valve to thereby remove the urea water solution before it is frozen to be crystallized.

In this SRC system, however, the emptying operation cannot be performed unless the exhaust gas temperature falls within the proper range. When restarting the engine which has been kept inoperative for many hours, since the temperature of exhaust gas is low, there is caused a problem that the crystallization of a urea water solution which Gems while the engine is kept stopped cannot be dealt with properly.

CITATION LIST

Patent Literature

PTL 1: JP-A-2014-145276
PTL 2: JP-A-2013-221425
PTL 3: JP-A-2011-247135

SUMMARY OF THE INVENTION

Technical Problem

The invention has been made in view of the situations described above, and an object of the invention is to provide a urea water solution injection system and a urea water solution crystallization prevention method for a urea water solution injection device which can dissolve urea formed in the urea water solution injection device as a result of a urea water solution being frozen to be crystallized when an internal combustion engine is started so as to prevent the sticking of the urea in the urea water solution injection device to thereby prevent a failure thereof.

Solution to Problem

With a view to achieving the object described above, there is provided a urea water solution in system comprising a urea water solution injection device for spraying a urea water solution into a portion of an exhaust passageway upstream of a selective catalytic reduction catalyst device to reduce NOx contained in exhaust gas discharged front an internal combustion engine, in which an engine coolant, is circulated through the urea water solution injection device to prevent the freezing of the urea water solution, wherein a control device for controlling the urea water solution, injection system comprises a crystal dissolution control unit for performing a crystal dissolution control OD the urea water solution injection device by energizing at a preset amount of energization at a state where a urea water solution supply pump for supplying a urea water solution to the urea water solution injection device is kept stopped, and wherein after the engine is started but before a urea water solution is started to be supplied, the control device is configured to control the crystal dissolution control unit to perform the crystal dissolution control for a crystal dissolving energization time that is calculated in advance.

According to the above-described configuration, before the urea water solution is started to be supplied after the internal combustion engine is started, not only can the frozen urea water solution be thawed but also the urea crystallized in the interior of the urea water solution it device can be dissolved by heating the urea water solution injection device using the engine coolant which flows through the interior thereof, energizing a coil for moving a needle (a plunger) of the urea water solution injection device and the synergistic effect of heating the urea water solution injection device by using the engine coolant and energizing the coil. Thus, it is possible to prevent the sticking of the urea water solution injection device which would otherwise be caused by the crystallized urea.

In the above-described urea water solution injection system, the control device includes a sticking state determination unit for determining whether or not the urea water solution injection device is in a sticking state by energizing the urea water solution injection device at the state where the urea water solution supply pump is kept stopped, and after the engine is started but before a urea water solution is started to be supplied, the crystal dissolution control unit performs the crystal dissolution control for the crystal dissolving energization time that is calculated in advance, and a preset stopping time has elapsed, the sticking state determination unit determines whether or not the urea water solution injection device is in the sticking state, and when it is determined that the urea water solution injection device is not in the sticking state, a urea water solution is sprayed into the portion of the exhaust passageway upstream of the selective catalytic reduction catalyst device by using the urea water solution injection device in accordance with a urea water solution supply request. According to this configuration, the following advantage is provided.

Namely, since the urea water solution is controlled to be sprayed after the sticking state determination unit determines that the urea water solution injection device is not in a sticking state after the internal combustion engine is started but before the urea water solution is started to be supplied, it is determined whether or not the urea water solution injection device fails before the urea water solution is started to be supplied, whereby it is possible to prevent the running of the internal combustion engine in such a state that NOx is reduced insufficiently. The determination on whether or not the urea water solution injection device is in a sticking, state is made by determining on a change ratio of a driving current of the urea water solution injection device (DV).

In the above-described urea water solution injection system, the control device includes an energization time calculation unit for calculating the crystal dissolving energization time based on any of or a combination of some of engine coolant temperature, outside air temperature and exhaust gas temperature. According to this configuration, the crystallized urea can be dissolved efficiently in a minimum time and with a minimum heat value required for dissolution of the crystallized urea, whereby the sticking of the urea water solution injection device due to the crystallized urea can be prevented.

The crystal dissolving energization time is set in advance through experiments based on engine coolant temperature, outside air temperature and exhaust gas temperature and is stored in the control unit in the form of a data map. Then, a crystal dissolving energization time is calculated by referring to the data map stored during control.

In the above-described urea water solution injection system the control device is configured to: when it is determined by the sticking state determination unit, the determination being made after the engine is started but before the urea water solution is started to be supplied, that the urea water solution injection device is in the sticking state, before a urea water solution is started to be sprayed, control the crystal dissolution control unit to further perform the crystal dissolution control for a newly calculated crystal dissolving energization time, control the sticking state determination unit to make the determination, and repeat a cycle of the crystal dissolution control by the crystal dissolution control unit and the determination made thereafter by the sticking state determination unit until it is determined that the urea water solution injection device is not in the sticking state; when the number of times of repeating the cycle exceeds a preset determination number of times of repeating the cycle, determine that failure occurs in the urea water solution device; and when it is determined that the urea water solution injection device is not in the sticking state during a time period at which the number of times of repeating the cycle is equal to or less than the preset determination number, control the urea water solution injection device to spray a urea water solution into the portion of the exhaust passageway upstream of the selective catalytic reduction catalyst device.

According to the above-described configuration, since the series of controls including the crystal dissolution control is performed repeatedly until the preset number of times of repeating the cycle which is set for determination is reached after the internal combustion engine is started but before the urea water solution is started to be supplied, the urea crystallized in the interior of the urea water solution injection device can be dissolved in a more ensured fashion, whereby the sticking of the urea water solution injection device due to the crystallized urea can be prevented.

In addition, since it is determined that failure occurs in the urea water solution injection device when the number of times of performing of the crystal dissolution controls exceeds the preset determination number of times of repeating the cycle, it is possible to detect a failure of the urea water solution injection device Which is attributed to other causes than the sticking thereof due to the crystallized urea therein to enhance the precision of failure detection.

In the above-described urea water solution injection system, the crystal dissolution control unit corrects the crystal dissolving energization time based on the number of times of repeating the cycle. According to this configuration, it is possible to perform a renewed crystal dissolution control which matches a change in temperature in the interior of the urea water solution injection device which is caused by the repetition of the crystal dissolution control. Therefore, it is possible to dissolve the crystallized urea with good efficiency while avoiding a risk of the urea water solution injection device being heated to high temperatures.

Then, with a view to achieving the above-described object, there is provided a method for preventing crystallization in a urea water solution injection device of a urea water solution injection system, which comprises the urea water solution injection device for spraying the urea water solution into a portion of an exhaust passageway upstream of a selective catalytic reduction catalyst device to reduce NOx contained in exhaust gas discharged from an internal combustion engine, and in which an engine coolant is circulated through the urea water solution injection device to prevent the freezing of the urea water solution, the method including: after the engine is started but before a urea water solution is started to be supplied, for a crystal dissolving energization time that is calculated based on any of or a combination of some of engine coolant temperature, outside air temperature and exhaust gas temperature, performing control of dissolving a crystal on the urea water solution injection device by energizing at a preset amount of energization at a state where a urea water solution supply pump for supplying a urea water solution to the urea water solution injection device is kept stopped, and after a preset stopping time has elapsed, determining whether or not the urea water solution injection device is in a sticking state With energizing the urea water solution injection device at a state where the urea water solution supply pump is kept stopped; when it is determined that the urea water solution injection device is in the sticking state, calculating a new crystal dissolving energization time is calculated based on any of or a combination of some of engine coolant temperature, outside air temperature and exhaust gas temperature, for the new crystal dissolving energization time, performing the control of dissolving the crystal on the urea water solution injection device b energizing at the preset amount of energization or a new preset amount of energization at the state where the urea water solution supply pump kept stopped, and after the preset stopping time or a new preset stopping time has elapsed, determining whether or not the urea water solution injection device is in the sticking state with energizing the urea water solution injection device at the state where the urea water solution supply pump is kept stopped; repeating a cycle of the calculating of the crystal dissolving energization time and the control of dissolving the crystal and the determining of whether or not in the sticking state until it is determined that the urea water solution injection device is not in the sticking state; when the number of times of repeating the cycle exceeds a preset determination number, determining that failure occurs in the urea water solution injection device; and when it is determined that the urea water solution injection device is not in the sticking state during a time period at which the number of times of repeating the cycle is equal to or less than the preset determination number, spraying the urea water solution into the portion of exhaust passageway upstream of the selective catalytic reduction catalyst device by using the urea water solution injection device in accordance with a urea water solution supply request.

Advantageous Effect of the Invention

According to the urea water solution injection system and the urea water solution crystallization prevention method for the urea water solution injection device, the crystallized urea can be dissolved alter the internal combustion endue is started but before the urea water solution is started to be supplied, whereby the failure of the urea water solution injection device can be prevented by preventing the sticking of the urea water solution injection device.

Consequently, since the drawback can be eliminated in which the urea water solution cannot be sprayed due to the needle of the urea water solution injection device being unable to move due to the crystallized urea, the case where the urea water solution injection device is erroneously misunderstood to fail due to the crystallization of the urea water solution can be excluded from a list of failure causes, whereby it is possible to prevent the erroneous removal of the urea water solution injection device from the urea water solution injection system which does not fail in reality and which is then recovered to its normal state when the crystallized urea is dissolved.

BRIEF DESCRIPTION OF DRAWINGS

FIG. 1 is a drawing showing the configuration of a control unit of a urea water solution injection system of an embodiment according to the invention.

FIG. 2 is a drawing showing an example of a control flow of a method for preventing the crystallization of a urea water solution in a urea water solution injection device of the embodiment according to the invention.

DESCRIPTION OF EMBODIMENTS

Hereinafter, referring to the drawings, a urea water solution injection system and a method for preventing the crystallization of a urea water solution in a urea water solution injection device of an embodiment according to the invention will be described.

A urea water solution injection system of the embodiment of the invention includes a urea Water solution injection device for spraying a urea water solution into a portion of an exhaust passageway which is disposed upstream of a selective catalytic reduction catalyst device to reduce NOx in exhaust gas discharged from an internal combustion engine. Additionally, an engine coolant is circulated to pass through the urea water solution injection device so as to prevent the freezing of a urea water solution.

Then, as shown in FIG. 1, a control unit 10 which controls the urea water solution injection system includes an energization time calculation unit 11, a crystal dissolution control unit 12 and a sticking state determination unit 13.

This energization time calculation unit 11 calculates a crystal dissolving energization time which is a period of time during which a coil in an interior of the urea water solution injection device is energized to dissolve urea which is formed in the urea water solution injection device as a result of a urea water solution being frozen to be crystallized based on any of engine coolant temperature, outside in temperature and exhaust gas temperature or a combination of some of them.

The energization time calculation unit 11 allows the urea formed as a result of crystallization of the urea water solution to be solved in a minimum time and with a minimum heat value which are required for solution of urea formed through crystallization of the urea water solution, whereby the sticking of the urea water solution injection device due to the crystallized urea can be prevented with a required minimum amount of electric energy.

This crystal dissolving energization time is set in advance through experiments based on engine coolant temperature, outside air temperature and exhaust gas temperature and is stored in the control unit in the form of a data map. Then, the energization time calculation unit 11 calculates a crystal dissolving energization time by referring to the data map stored during control. This crystal dissolving energization time normally takes a value which falls within a range of the order of 300s or shorter. In a special case where the engine coolant temperature, the outside air temperature and the exhaust gas temperature are high enough for the crystallized urea to be dissolved under natural conditions without being energized, the urea crystal dissolving energization time is set at zero.

The crystal dissolution control unit 12 performs a crystal dissolution control in which the crystal dissolution control unit 12 energizes the urea water solution injection device with a preset amount of energization with a urea water solution supply pump for supplying a urea Water solution to the urea water solution injection device kept stopped. Since the crystal dissolution control unit 12 can enable the urea water solution injection device to be heated by not only using an engine coolant of the order of 70° C. which flows through an interior thereof but also energizing a coil for moving a needle (a plunger) of the urea water solution injection device, not only can the frozen urea water solution be thawed but also the urea crystallized in the interior of the urea water solution injection device can be dissolved by the synergistic effect of heating the urea water solution injection device by using the engine coolant and energizing the coil.

An amount of energization which enables the urea water solution injection device to be fully opened may be used for the amount of energization (the energization per unit tune) of the coil. However, in order to prevent the overheat of the coil, it is preferable that an optimum amount of energization is obtained in advance through experiments and that the amount of energization of the coil is set at the optimum amount of energization. Since this amount of energization of the coil is also related to the crystal dissolving energization time, the amount of energization of the coil may be caused to change with the crystal dissolution energizing time. The amount of energization is normally in the range of the order of 100% to 5% of the amount of energization by which the urea water solution injection device is opened fully.

The sticking state determination unit 13 determines whether or not the urea water solution injection device is in a sticking state by energizing the urea water solution injection device with the urea water solution supply pump kept stopped. This sticking state determination unit 13 enables a selection between repeating the crystal dissolution control and making a determination that the urea Water solution injection device does not stick due to the crystallized urea. The determination on the sticking state of the urea water solution injection device can be made based on a change ratio of a driving current of the urea water solution injection device (DV).

Then, the control unit 10 which controls the urea water solution injection system is configured so that the crystal dissolution control unit 12 performs the crystal dissolution control during the crystal dissolving energization time which is calculated in advance by the energization time calculation unit 11 after the engine is started but before the urea water solution is started to be supplied. By doing so, after the engine is started but before the urea water solution is started to be supplied, not only can the frozen urea water solution be thawed but also the urea crystallized in the interior of the urea water solution injection device can be dissolved by heating the urea water solution injection device using the engine coolant which flows through the interior thereof, energizing the coil for moving the needle (the plunger) of the urea water solution injection device and the synergistic effect of heating the urea water solution injection device by using the engine coolant and energizing the coil.

When the internal combustion engine is started, the exhaust gas temperature is low and the selective catalytic reduction catalyst for reduction or removal of NOx is not activated. Therefore, the urea water solution has not yet been started, and the urea water solution pump is kept stopped.

Further, the sticking state determination unit 13 determines whether or not the urea water solution injection device is in a sticking state after a preset stopping time has elapsed since the end of the crystal dissolution control. In case it is determined that the urea water solution injection device is not in a sticking state, the urea water solution injection device sprays the urea water solution into a portion of an exhaust passageway which is disposed upstream of a selective crystal reduction catalyst device in response to a urea water solution supply request.

Although the stopping time may be set at zero, since the thermal inertia of the energization of the coil can be made use of, it should preferably be avoided that the stopping time is set at such a long time as that the urea water solution injection device is cooled to lose the heating effect by the energization thereof. Thus, the stopping time is set in advance through experiments. Normally, the stopping time takes a numerical value which falls within a range of the order of 10s or shorter.

In case it is determined that the urea water solution injection device is in a sticking state, before the urea water solution is started to be supplied, the crystal dissolution control unit 12 performs further the crystal dissolution control during a crystal dissolving energization time which is newly calculated, whereafter, the sticking state determination unit 13 makes a determination. Then, this cycle of the performing of the crystal dissolution control by the crystal dissolution control unit 12 and the determination b the determination unit 13 made thereafter will be repeated until the sticking state determination unit 13 determines that the urea water solution injection device is not in a sticking state.

Then, when the number of times of repeating the cycle of the crystal dissolution control by the crystal dissolution control unit 12 and the determination by the determination unit 13 exceeds a preset number of times of determination, the determination unit 13 determines that the urea water solution injection device fails, whereas in case the determination unit 13 determines that the urea water solution injection device is not in a sticking state on or before the arrival of the number of times of repeating the cycle at the preset number of times of determination, the area water solution injection device sprays the urea water solution into the portion of the exhaust passageway which is disposed upstream of the selective catalytic reduction catalyst device in response to the urea water solution supply request. The number of times of determination is set at the order of 3 to 6 times, for example.

It is preferable that the crystal dissolution control unit 12 corrects the crystal dissolving energization time based on the number of times of repeating the cycle, and by doing so, it is possible to perform a renewed crystal dissolution control which matches a change in temperature in the interior of the urea water solution injection device which is caused by the repetition of the crystal dissolution control. Therefore, it is possible to dissolve the crystallized urea with good efficiency while avoiding a risk of the urea water solution injection device being heated to high temperatures. A method of correcting the crystal dissolving energization time by the crystal dissolution control unit 12 is set in advance through experiments.

Next, a urea water solution crystallization prevention method of the embodiment according to the invention will be described. This urea water solution crystallization prevention method is provided for the urea water solution injection system which includes the urea water solution injection device for spraying the urea water solution into the portion of the exhaust passageway which is disposed upstream of the selective catalytic reduction catalyst device to reduce NOx contained in the exhaust gas discharged from the internal combustion engine and ill which the engine coolant is circulated through the urea water solution injection device to prevent the freezing of the urea water solution therein.

In this method, a urea crystal dissolution control is performed on the urea water solution injection device in which the urea water solution injection device is energized with a preset amount of energization for the crystal dissolving energization time which is calculated based on any one of or a combination of some of engine coolant temperature, outside air temperature and exhaust gas temperature after the engine is started but before the urea water solution is started to be supplied with the urea water solution supply pump kept stopped which supplies the urea water solution to the urea water solution injection device.

Thereafter, the urea water solution injection device is energized with the urea water solution supply pump kept stopped alter a preset stopping time has elapsed, and a first series of controls is performed to determine whether or not the urea water solution injection device is in a sticking state. The amount of energization becomes maximum when the urea water solution injection device is fully opened, and the heat value thereof increases accordingly. However, it is preferable that an amount of energization which is good enough to dissolve a crystal of urea is obtained in advance through experiments for use for the amount of energization.

When it is determined by the above-described determination that the urea water solution injection device is not in a sticking state, a urea water solution is sprayed into the portion of the exhaust passageway which is disposed upstream of the selective catalytic reduction catalyst device in response to a urea water solution supply request by using the urea water solution injection device. On the other hand, in case it is determined that the urea water solution injection device is in a sticking state, a further crystal dissolving energization time is calculated based on an one of or a combination of some of engine coolant temperature, outside air temperature and exhaust as temperature, and a second series of crystal dissolution controls is performed on the urea water solution injection device in which the urea water solution injection device is energized with the previous preset amount of energization or a new preset amount of energization for the further crystal dissolving energization time with the urea water solution supply pump kept stopped. This new preset amount of energization may be the same as the previous preset amount of energization. However, in consideration of the fact that the temperature of the urea water solution injection device is increased by the previous energization, it is preferable that the new preset amount of energization is smaller than the previous preset amount of energization.

Thereafter, the urea water solution injection device is energized with the urea water solution supply pump driven after a preset stopping time has elapsed which is the same as the previous preset stopping time or a newly preset one, and it is determined then whether or not the urea water solution injection device is in a sticking state. The crystallized urea can be dissolved more efficiently by determining the stopping time in consideration of the history of temperature increases in the urea water solution injection device.

Then, when a cycle of calculation of a crystal dissolving energization time, performing of the crystal dissolution control and determination on whether or not the urea water solution injection device is in a sticking state is repeated until it is determined by the determination made in the way described above that the urea water solution injection device is not in a sticking state and the number of times of repeating the cycle exceeds the preset number of time of determination, it is determined that the urea water solution injection device fails.

When it is determined by the above-described determination that the urea water solution injection device is not in a sticking state on or before the arrival of the number of times of repeating the cycle at the number of times of repeating the cycle set for determination, a urea water solution is sprayed into the portion of the exhaust passageway which is disposed upstream of the selective catalytic reduction catalyst device in response to a urea water solution supply request by using the urea water solution injection device.

The urea water solution crystallization prevention method of the embodiment can be performed by following a control flow as shown in FIG. 2. When the engine is started, the control flow shown in FIG. 2 is called for from a host control flow and is then started.

When the control flow shown in FIG. 2 starts, in step S11, an engine coolant temperature, an outside sir temperature and an exhaust gas temperature are inputted, and a crystal dissolving energization time is calculated based on any one of or a combination of some of these temperatures. Additionally the number of times of repeating the cycle is set at one time.

In the next step, that is, in step S12, it is confirmed that the urea water solution supply pump for supplying a urea water solution to the urea water solution injection device is stopped. In case the urea water solution supply pump is not stopped, the pump is then stopped. Then, the urea water solution injection device is energized with the preset amount of energization for the crystal dissolving energization time which is calculated in step S11, and the urea crystal dissolution control is performed.

Then, in step S13, the energization is stopped to wait until the preset stopping time is elapsed. After this waiting time is elapsed, in step S14 the urea watch solution is device is energized with the urea water solution supply pump kept stopped, and it is then determined whether or not the urea water solution injection device is in a sticking state.

If it is determined by the determination made in step S14 that the urea water solution injection device is not in a sticking state, the control flow proceeds to step S30, where understanding that the crystallized urea is dissolved, a signal which signals the dissolution of the crystallized urea is issued. Thereafter, the control flow returns to the host control flow, where the urea water solution injection device sprays a urea water solution into the portion of the exhaust passageway Which is disposed upstream of the selective catalytic reduction catalyst device in response to the urea water solution supply request to reduce NOx contained in the exhaust gas.

On the other hand, if it is determined in step S14 that the urea water solution injection device is in a sticking state, the control flow proceeds to step S21. In step S21, an engine coolant temperature, an outside air temperature and an exhaust gas temperature are inputted, and a new crystal dissolving energization time is calculated based on any one of or a combination of some of these temperatures. The number of times of repeating the cycle is increased by one from the previous number of times of repeating the cycle.

In step S22, the urea water solution injection device is energized for the crystal dissolving energization time which is calculated in step S21, and the urea crystal dissolution control is performed.

Then, in step S23, the energization is stopped to wait until the preset slopping time is elapsed. After this waiting time is elapsed, in the next step, that is, in step S24, the urea water solution injection device is energized with the urea water solution supply pump kept stopped, and it is then determined whether or not the urea water solution injection device is in a sticking state.

If it is determined by the determination made in step S24 that the urea water solution injection device is not in a sticking state, the control flow proceeds to step S30, where understanding that the crystallized urea is dissolved, a signal which signals the dissolution of the crystallized urea is issued. Thereafter, the control flow returns to the host control flow, where the urea water solution injection device sprays a urea water solution into the portion of the exhaust passageway which is disposed upstream of the selective catalytic reduction catalyst device in response to the urea water solution supply request to reduce NOx contained in the exhaust gas.

On the other hand, if it is determined in step S24 that the urea water solution injection device is in a sticking state, the control flow proceeds to step S25. In step S25, it is determined whether or not the number of times of repeating the cycle exceeds the preset number of times of repeating the cycle which is set for determination.

If it is determined by the determination made in step S25 that the number of times of repeating the cycle does not exceed the number of times of repeating the cycle which is set for determination, the control flow returns to step S21. If it is determined that the number of times of repeating the cycle exceeds the number of times of repeating the cycle which is set for determination, the control flow proceeds to step S40, and it is determined that failure occurs in the urea water solution injection device, and a failure signal is issued. Then, the control flow returns to the host control flow. A urea water solution is supplied to reduce NOx. By these controls, the above-described crystallization prevention method for the urea water solution injection device can be performed.

According to the urea water solution injection system and the urea water solution crystallization prevention method for a urea water solution injection device of the invention, since the crystal dissolution control continues to be performed until it is determined that the urea water solution injection device is trot in a sticking state after the internal combustion engine is started but before the urea water solution is started to be supplied, the urea crystallized in the interior of the urea water solution injection device can be dissolved further, whereby the sticking of the urea water solution injection device due to the crystallized urea can be prevented.

Moreover, since the series of controls including the crystal dissolution control is performed repeatedly until the preset number of tunes of repeating the cycle which is set for determination is reached after the internal combustion engine is started but before the urea water solution is started to be supplied, the urea crystallized in the interior of the urea water solution injection device can be dissolved in a more ensured fashion, whereby the sticking of the urea water solution injection device due to the crystallized urea can be prevented.

In addition, since it is determined that the urea water solution injection device fails when the number of times of performing of the crystal dissolution controls exceeds the number of times of repeating the cycle which is set for determination, it is possible to detect a failure of the urea water solution injection device which is attributed to other causes than the sticking thereof due to the crystallized urea therein to enhance the precision of failure detection.

As a result, the crystallized urea can be dissolved after the internal combustion engine is started but before the urea water solution is started to be supplied, whereby the failure of the urea water solution injection device can be prevented by preventing the sticking of the urea water solution injection device. Additionally, since the drawback can be eliminated in which the urea water solution cannot be sprayed due to the needle of the urea water solution injection device being unable to move due to the crystallized urea, the case where the urea water solution injection device is erroneously misunderstood to fail due to the crystallization of the urea water solution can be excluded from a list of failure causes, whereby it is possible to prevent the erroneous removal of the urea water solution it device from the urea water solution injection system which does not fail in reality and which is then recovered to its normal state when the crystallized urea is dissolved.

REFERENCE SIGNS LIST

10 Control unit (Control unit for controlling urea water solution injection system)
11 Energization time calculation unit
12 Crystal dissolution control unit
13 Sticking determination unit

The invention claimed is:

1. A urea water solution injection system comprising:
a urea water solution injection device for spraying a urea water solution into a portion of an exhaust passageway upstream of a selective catalytic reduction catalyst device to reduce NOx contained in exhaust gas discharged from an internal combustion engine, in which an engine coolant is circulated through the urea water solution injection device to prevent the freezing of the urea water solution; and
a controller for controlling the urea water solution injection system, wherein the controller:
performs a crystal dissolution control on the urea water solution injection device by energizing a coil for moving a needle (a plunger) of the urea water solution injection device at a preset amount of energization at a state where a urea water solution supply pump for supplying the urea water solution to the urea water solution injection device is kept stopped, and
calculates a crystal dissolving energization time based on any of or a combination of some of engine coolant temperature, outside air temperature, and exhaust gas temperature,
wherein after the engine is started but before the urea water solution is started to be supplied, the controller performs the crystal dissolution control for the crystal dissolving energization time that is calculated in advance.

2. The urea water solution injection system according to claim 1,
wherein the controller:
determines whether or not the urea water solution injection device is in a sticking state by energizing the urea water solution injection device at the state where the urea water solution supply pump is kept stopped, and
wherein after the engine is started but before the urea water solution is started to be supplied, the controller performs the crystal dissolution control for the crystal dissolving energization time that is calculated in advance, and a preset stopping time has elapsed, the controller determines whether or not the urea water solution injection device is in the sticking state, and when it is determined that the urea water solution injection device is not in the sticking state, a urea water solution is sprayed into the portion of the exhaust passageway upstream of the selective catalytic reduction catalyst device by using the urea water solution injection device in accordance with a urea water solution supply request.

3. The urea water solution injection system according to claim 2, wherein the controller is configured to:
when it is determined by the controller that the urea water solution injection device is in the sticking state, the determination being made after the engine is started but before the urea water solution is started to be supplied, further perform the crystal dissolution control for a newly calculated crystal dissolving energization time, before the urea water solution is started to be sprayed,
controller to make the determination, and
repeat a cycle of the crystal dissolution control and the determination made thereafter by the controller until it is determined that the urea water solution injection device is not in the sticking state;
when the number of times of repeating the cycle exceeds a preset determination number of times of repeating the cycle, determine that failure occurs in the urea water solution device; and
when it is determined that the urea water solution injection device is not in the sticking state during a time period at which the number of times of repeating the cycle is equal to or less than the preset determination number, control the urea water solution injection device to spray a urea water solution into the portion of the exhaust passageway upstream of the selective catalytic reduction catalyst device.

4. The urea water solution injection system according to claim 3, wherein the controller corrects the crystal dissolving energization time based on the number of times of repeating the cycle.

5. The urea water solution injection system according to claim 1,
wherein the controller calculates the crystal dissolving energization time based on any of or a combination of some of engine coolant temperature, outside air temperature and exhaust gas temperature.

6. A method for preventing crystallization in a urea water solution injection device of a urea water solution injection system, which comprises the urea water solution injection device for spraying a urea water solution into a portion of an exhaust passageway upstream of a selective catalytic reduction catalyst device to reduce NOx contained in exhaust gas discharged from an internal combustion engine, and in which an engine coolant is circulated through the urea water solution injection device to prevent the freezing of the urea water solution, the method comprising:
after the engine is started but before a urea water solution is started to be supplied,
for a crystal dissolving energization time that is calculated based on any of or a combination of some of engine coolant temperature, outside air temperature and exhaust gas temperature, performing control of dissolving a crystal on the urea water solution injection device by energizing at a preset amount of energization at a state where a urea water solution supply pump for supplying a urea water solution to the urea water solution injection device is kept stopped, and
after a preset stopping time has elapsed, determining whether or not the urea water solution injection device is in a sticking state with energizing the urea water solution injection device at a state where the urea water solution supply pump is kept stopped;

when it is determined that the urea water solution injection device is in the sticking state,
calculating a new crystal dissolving energization time is calculated based on any of or a combination of some of engine coolant temperature, outside air temperature and exhaust gas temperature,
for the new crystal dissolving energization time, performing the control of dissolving the crystal on the urea water solution injection device by energizing at the preset amount of energization or a new preset amount of energization at the state where the urea water solution supply pump kept stopped, and
after the preset stopping time or a new preset stopping time has elapsed, determining whether or not the urea water solution injection device is in the sticking state with energizing the urea water solution injection device at the state where the urea water solution supply pump is kept stopped;
repeating a cycle of the calculating of the crystal dissolving energization time and the control of dissolving the crystal and the determining of whether or not in the sticking state until it is determined that the urea water solution injection device is not in the sticking state;
when the number of times of repeating the cycle exceeds a preset determination number, determining that failure occurs in the urea water solution injection device; and
when it is determined that the urea water solution injection device is not in the sticking state during a time period at which the number of times of repeating the cycle is equal to or less than the preset determination number, spraying the urea water solution into the portion of exhaust passageway upstream of the selective catalytic reduction catalyst device by using the urea water solution injection device in accordance with a urea water solution supply request.

* * * * *